Jan. 19, 1954 J. P. ENGEL 2,666,494
DISPOSAL OF FUMES BY SCRUBBING AND BURNING
Filed Aug. 31, 1951 2 Sheets-Sheet 1
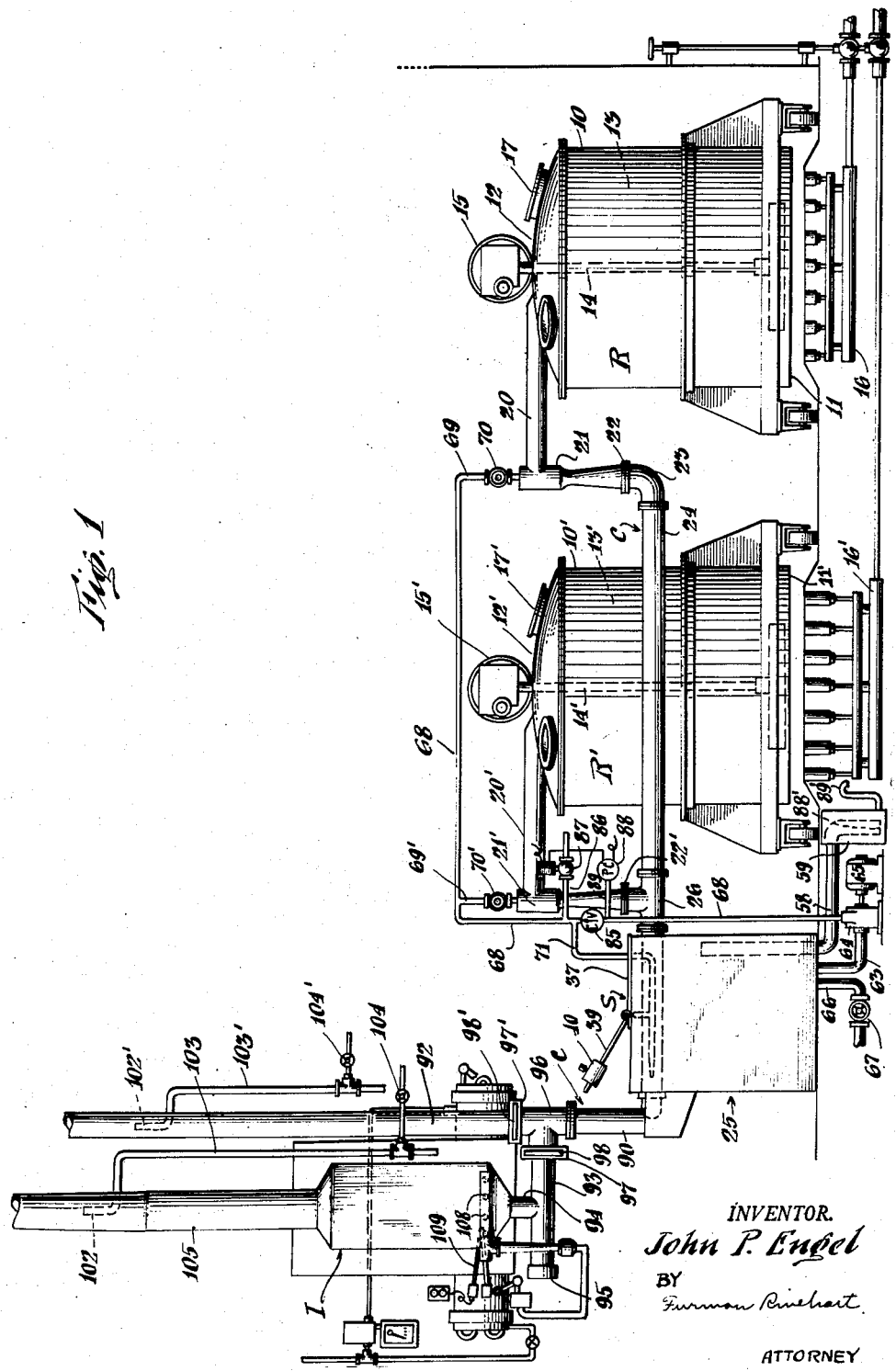
INVENTOR.
John P. Engel
BY
Furman Rinehart
ATTORNEY

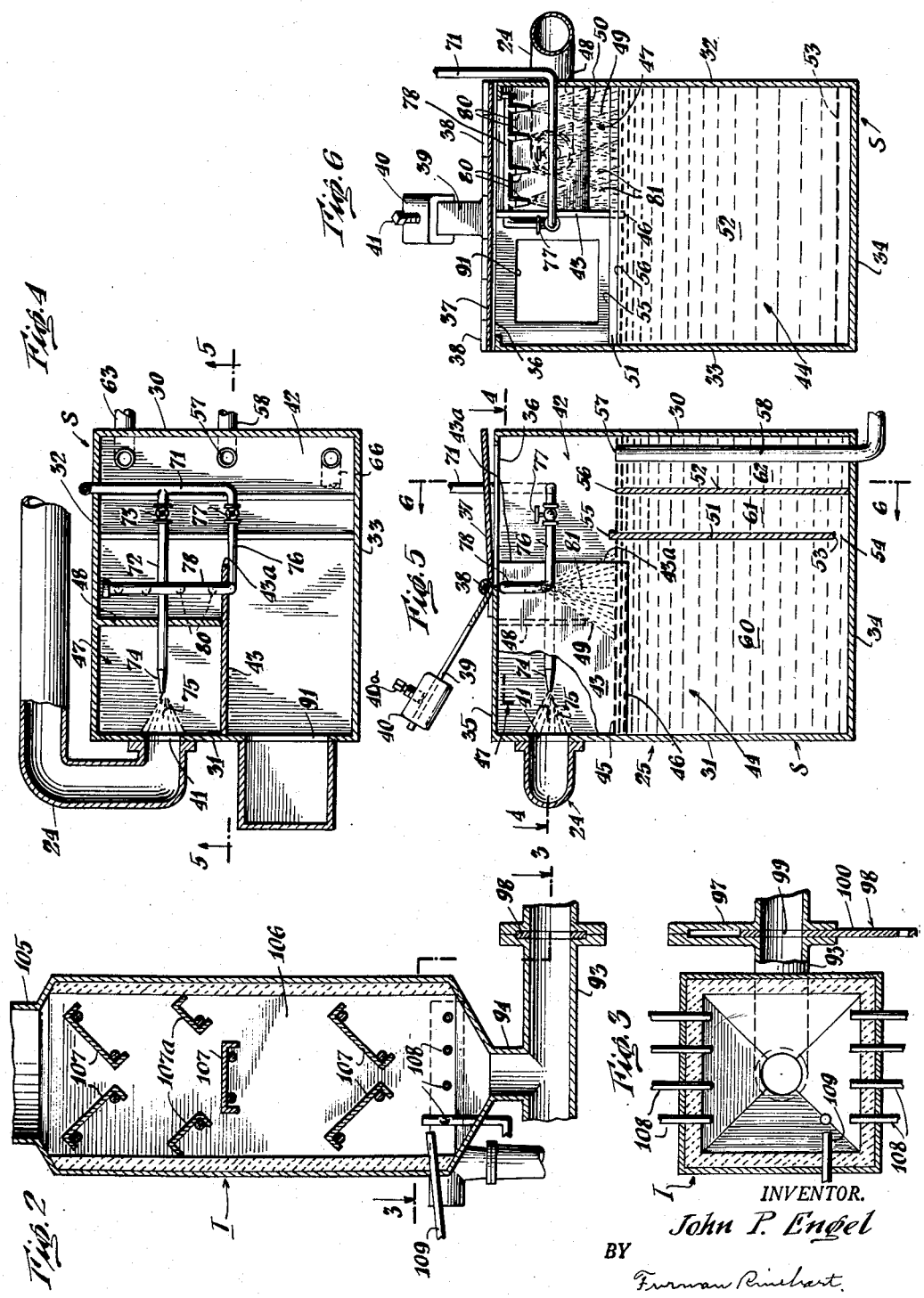

Patented Jan. 19, 1954

2,666,494

UNITED STATES PATENT OFFICE 2,666,494

DISPOSAL OF FUMES BY SCRUBBING AND BURNING

John P. Engel, Miller Place, N. Y., assignor to Sapolin Paints, Inc., New York, N. Y., a corporation of New York Application August 31, 1951, Serial No. 244,544

9 Claims. (Cl. 183—6)

This invention relates to disposal of fumes generated in the reactors of varnish and paint making establishments.

In plants where varnish or other similar products are made by the treatment of oils and other ingredients in a varnish maker's kettle or reactor, the reaction generates fumes which are unwanted and obnoxious. These fumes have to be disposed of and in many localities disposal without creating a nuisance is required. They are burnable and unless carefully handled and properly dissipated they create an explosion hazard.

In my copending application Serial No. 151,284, filed March 22, 1950, now Patent No. 2,656,008, issued October 20, 1953, I have pointed out various methods which have been proposed for disposal of these unwanted fumes and have there disclosed and claimed a method and apparatus for disposal of such fumes by incineration. The apparatus and method disclosed in that patent operates successfully but it made no special provision for operation simultaneously of two or more reactors which might be connected to the same incinerator chamber. The draft was preferably regulated by an adjustable draft inducing means located in the discharge stack. When two or more reactors were connected to the same incinerator furnace and in operation at the same time, the control of the draft in the respective reactors was not all that was to be desired inasmuch as the reactors might not be on the same operating time cycle and there are variations in the quantities of fumes generated in the different ractors at any given time.

It is a principal object of this invention to provide a system for the disposal of unwanted fumes generated in the reactors used for producing varnish or other similar heat reacted oils and resins which system is adapted for safe and efficient disposal of fumes in a single incinerator chamber whether one or more reactors are connected to the same incinerator chamber and operating at the same time.

According to this invention, the incinerator furnace and its control means are substantially the same as disclosed in my aforesaid Patent No. 2,656,008 and the reactors are equipped with substantially the same means for charging protective $CO_2$ into the reactors when desired and under the same conditions but more than one reactor is connected in the same system with a single incinerator chamber and means are provided to selectively control the draft in each of the plural reactors, such means being connected to a water scrubber chamber and arrangement in the system adapted to provide a water curtain which not only absorbs or condenses and traps out a part of the fumes thereby lightening the burden on the common incinerator furnace but also affords additional protection against the hazard of a flash back from the incinerator to the reactors.

Although the novel features which are believed to be characteristic of the invention will be pointed out in the annexed claims, the invention itself as to its objects and advantages and the manner in which it may be carried out may be better understood by reference to the following description taken in connection with the accompanying drawings forming a part hereof, in which:

Fig. 1 is a view in elevation, partly diagrammatic, showing a plant embodying the invention;

Fig. 2 is a section view and to larger scale through the incinerator furnace;

Fig. 3 is a view in section on line 3—3 of Fig. 2;

Fig. 4 is a plan view in section of the scrubber tank which is interposed in the fume discharge conduit between the reactors and incinerator, on line 4—4 of Fig. 5;

Fig. 5 is an elevation view in section of the scrubber tank, on line 5—5 of Fig. 4; and Fig. 6 is an elevation view in section of the scrubber tank, on line 6—6 of Fig. 5.

Referring now to the drawings, in which like reference characters denote like parts in the several views, the plant as illustrated comprises in general an incinerator unit I, two reactor units R and R' connected to a common main fume conduit C leading to the incinerator in which is interposed a scrubber tank unit S. It will be understood that the reactor units R and R' are equipped with the usual charging, discharging equipment and other control and operating devices usually associated with such reactors but I prefer to employ an arrangement with each reactor vessel such as disclosed in my aforesaid Patent No. 2,656,008. The incinerator unit I is also equipped with control apparatus, preferably as described in detail in my aforesaid Patent 2,656,008.

Reactors R and R' are of the closed type and of like construction; therefore a description of one will suffice. Reactor R comprises a cylindrical wall 10, bottom wall 11, top closure wall 12, all of which provide the reaction chamber 13, a stirrer 14 driven by motor 15. A burner 16 provides means for heating the reactor. The top wall has an openable and closeable hatch 17, The corresponding parts of reactor R' are designated by the same reference characters with a "prime" designation.

Leading from the top closure 12 of reactor R is a fume discharge pipe 20 connected to a water powered spray-type ejector 21 having its discharge end 22 connected through an elbow 23 to main conduit pipe 24 which leads into scrubber tank 25. Leading from the top closure 12' of reactor R' is a fume discharge pipe 20' connected to a water powered spray-type ejector 21' having its discharge end 22' connected to main conduit pipe 24 through a T 26. These ejectors 21 and 21' provide means for independently adjusting the amount of suction or draft in each of the reactors.

The scrubber tank 25 comprises end walls 30, 31, and side walls 32 and 33, bottom wall 34 and top wall 35. The top wall 35 has an opening 36 providing a passageway for atmospheric air into the interior of the tank. The top wall is provided with a door 37 mounted to cover and close the air passageway 36. The door 37 is hinged at its inner end by hinges 38 secured to the door and to the top wall 35. Secured at one end to the door 37 is an upwardly inclined lever arm 39 having a counterweight 40 slidably mounted on its opposite free end. A set screw 40a extending through the counterweight to engage the lever is provided for maintaining the counterweight in any desired position along the lever arm. Consequently the effective lever length of the lever arm 39 can be adjusted as desired. This arrangement provides an adjustable air intake passageway, the effective or open area being made greater or less by adjustment of the door 37 and the counterweight on the lever arm 39 so that it balances at the desired adjusted position of the door. Also, should a flash back occur in the scrubber tank, the door will readily fly open to provide escape for the added internal pressure.

The main conduit 24 leads into a plenum chamber 47 in the scrubber tank 25 which joins with an air mixing chamber 42, these together forming a fume passageway through the tank. The scrubber tank has a vertical baffle 43, herein called a guide baffle, depending from the top wall 35. As will be mentioned in further detail later on, the scrubber tank 25 carries a body of water 44 the normal level 45 of which is above the lower edge 46 of baffle 43. This baffle 43 together with the side wall 32, top wall 35, and the surface 45 of the water forms a tunnel-like chamber which, for convenience of description is referred to as a plenum or spray chamber and is designated generally by reference character 47. Within and crosswise of the tunnel-like chamber 47 is a vertical baffle 48 depending from the top wall 35 and secured to the side wall 32 and baffle 43. This baffle terminates short of the surface 45 of the body of water in the tank thus providing a fume passageway 49 under the edge 50 of baffle 48 and surface 45 of the water and also providing a shield in front of certain spray nozzles in the tunnel 47 described later on.

The tank 25 is also provided with baffles 51 and 52 forming a tray to tray out condensed and water soluble fumes from the stream of fumes passing from the reactors through plenum chamber 47, these baffles also providing a particular flow path for the water through the tank. Baffle 51 extends from side wall 32 to side wall 33 and terminates at its lower end 53 short of the bottom 34 thus providing passageway 54 for water. Its upper edge 55 extends above the normal surface 45 of the water 44 in the tank which as explained later on is circulated through the system. The end 43a of vertical baffle 43 terminates short of the upstanding baffle 51.

Baffle 52 extends from side wall 32 to side wall 33 and to the bottom 34 of tank 25. Its upper edge 56 is level with the inlet 57 of overflow pipe 58, which pipe leads downwardly and out of the tank into a water seal 59. The upper edge 56 of baffle 52 is lower than the upper edge 55 of baffle 51. From the foregoing description it will be seen that the lower portion of tank 25 is divided into three compartments; these for convenience of description being herein designated condensed fume compartment 60, intermediate compartment 61, and pump supply and overflow compartment 62. It will also be seen that the surface of water 44 in the tank together with baffles 43, side wall 32 and top wall 35 form the tunnel-like plenum chamber 47 and together with walls 32, 30, 35 and 33 form air-fume mixing chamber 42, notwithstanding that the water is flowing into compartment 60, thence through passageway 54, thence upwardly in compartment 61, and over the edge 56 of baffle 52 into compartment 62. Also the arrangement of baffles provides a particular path of travel for water flowing through the tank. And it will be noted that plenum 47 and air-fume mixing chamber 42 form a fume passageway through the tank 25.

Leading from the bottom of compartment 62 is a pump suction pipe 63 connected to the suction side of a rotary water pump 64, driven by motor 65. The pump suction compartment 62 has a drain pipe 66 leading from the bottom of the tank 25. The drain pipe is openable and closable by a valve 67.

The discharge pipe 68 from the water circulating pump 64 is connected to a system of piping which feeds water under pressure to ejectors 21 and 21' and also to the spray nozzles in spray chamber 47. Leading from pipe 68 is a pipe 69 which connects with the inlet of the water powered spray-type ejector 21. It has a control valve 70 to regulate the flow of water to the ejector and thereby the amount of suction or draft in fume pipe 20 can be varied and controlled. Leading from pipe 68 is a pipe 69' which connects with the water powered ejector 21'. It has a control valve 70' to regulate the flow of water to that ejector. This controls the amount of suction in pipe 20'. Thus the amount of suction in each of reactors R and R' can be independently regulated and controlled.

Also leading from pipe 68 is a pipe 71. Branching from pipe 71 is a pipe 72 having a control valve 73 and a spray nozzle 74. The spray nozzle 74 is of the type which discharges a cone-shaped spray and it should be observed that the nozzle is positioned so that the axis of the cone spray 75 is at the center of port 41. Thus the spray 75 provides in effect a water curtain over this port 41.

Leading from pipe 71 is a pipe 76 having a control valve 77. Pipe 76 is connected to a header 78 to which is connected a plurality of downwardly directed cone spray nozzles 80, disposed so that their cone sprays 81 of water provide in effect a water curtain across the fume passageway 49. It should be noted here that the baffle 48 provides a shield in front of the spaces between the nozzles 80 and thus the water curtain 81 extends over the entire area of the fume passageway 49. Consequently fumes passing from plenum 47 into air mixing chamber 42 must pass through the water curtain. Also fumes passing through fume pipe 24 through port 41 into the plenum or spray chamber 47 must pass through water curtain 75. The water curtain 75 provides an adjustable pervious curtain which sets up what in effect is a back pressure against the discharge of ejectors 21 and 21'. Water curtain 81 provides a pervious curtain between the plenum or spray chamber 47 and air-fume mixing chamber 42.

The discharge pipe 68 from pump 64 has a check valve 85 and on the discharge side of valve 85 is a branch pipe 86 which is connected to a source of supply of water under pressure, such as the public utility water lines. This branch pipe 86 is equipped with a control valve 87 which is operated in response to a pressure control switch 88 which is connected by a pipe 89 to pipe 68 on the intake side of check valve 85. This arrangement is such that should pump 64 fail to maintain a predetermined pressure in pipe 68, the pressure switch control 88 actuates valve 87 to charge water from the utility line through pipe 86 into pipe 68. But so long as pump 64 maintains flow of water at desired pressure from tank 25 into pipe 68 the valve 87 remains closed.

The tunnel-like fume-air mixing chamber 42 connects with main fume conduit pipe 90 through a fume discharge port 91. The pipe 90 has two branching pipes 92 and 93. Pipe 92 provides a stack which leads directly to the atmosphere. Pipe 93 has an outlet pipe 94 leading into the incinerator chamber 106 and a removable end closure cap 95. These branching fume pipes have a valve arrangement whereby the fumes passing through the main fume conduit C may be directed to the incinerator or the incinerator may be by-passed and the fumes sent directly to atmosphere. As shown, this valve arrangement comprises a T 96 which has interposed in pipe 93 a slide valve housing 97 in which is mounted a slidable plate valve 98 having an aperture 99 and a blanking off solid portion 100. By sliding the plate valve 98 out so that the aperture registers with the T outlet, the valve is opened, and when the plate is moved in, the blanking off portion 100 closes the passageway between the T 96 and pipe 93. A similar housing 97' and plate valve 98' is interposed between the stack pipe 92 and T 96 so that this valve can be likewise opened or closed. When it is desired to direct the fumes from scrubber tank 25 to stack pipe 92 and hence directly to atmosphere, valve 98 is closed and valve 98' is opened. On the other hand, if it is desired to burn the fumes, valve 98' is closed and valve 98 is opened.

Draft is induced in stack pipe 92 by a steam ejector 102' connected to a steam pipe 103' which is connected to a suitable source of steam pressure; the amount of draft being adjustable and controlled by a control valve 104'. Likewise draft in stack pipe 105 leading from the incinerator furnace chamber 106 to atmosphere is induced by a steam ejector 102 connected to steam pipe 103 in turn connected to a source of steam pressure; the amount of draft being adjustable and controlled by a control valve 104.

The incinerator unit I is constructed as more fully described in my aforesaid Patent No. 2,656,003. In general, it comprises a refractory lined combustion chamber 106 providing a combustion zone in which is mounted baffles 107, 107a providing a tortuous path for the travel of combustion gases upwardly through the combustion zone. It has gas burners 108 connected to a gas supply such as the public utility lines, a pilot 109 and control apparatus whereby the amount of gas supplied to the burners 108 is controlled in response to the temperature in the combustion chamber 106, all as disclosed in my aforesaid patent. Suffice it to say that the incinerator combustion chamber 106 is maintained incandescent when the incinerator unit is being used so that the fumes passing from the scrubber tank 25 are completely burned. Air is drawn into the mixing chamber 42 through air port 36 and therein carburetted by the fumes in the stream of fumes drawn from the reactors and passed through scrubber chamber 47. The air-fume mixture is then passed through outlet port 91 of scrubber tank 25 into main conduit pipe 90 and thence through valve 98 into pipe 93 and finally into the combustion chamber 106 where the fumes are totally burned. The combustion gases then pass through stack 105 and are dissipated into the atmosphere. Under these conditions, the valve 98' will, of course, be closed. It will be apparent also that, if desired, the incinerator unit I may be by-passed by closing valve 98 and opening valve 98', in which case the fumes may be directed through stack 92 without first being burned.

In describing the operation of the fume disposal system it may be assumed that both reactors R and R' are charged with reacting oils, resins, or the like, and the reaction is going on which generates unwanted fumes. The scrubber tank will have been charged with water so that when water is circulated in the system by pump 64 from tank 25, through ejectors 21 and 21' and through nozzles 74 and 80, the water level 45 in compartment 60 will be above the lower edge 46 of baffle 43 and below the upper edge 55 of baffle 51. The pump 64 will take suction out of compartment 62 and the water circulated by the pump passes through ejectors 21 and 21' and nozzles 74 and 80. The ejected water from the ejectors passes through main conduit 24 into compartment 60 as will also the water from the spray nozzles. The water in compartment 60 will flow through the submerged passageway 54, up through compartment 61, over the edge 56 of baffle 52 into compartment 62. In the event that the level of water in tank 25 tends to go above the inlet 57 of overflow pipe 58 the excess will flow down pipe 58 into water seal 59. It should be noted that its lower end 88' is lower than the seal outlet 89'.

The ejectors 21 and 21' induce a suction in their respective reactors R and R', and withdraw the generated fumes therefrom and discharge the fumes in a stream into main conduit pipe 24 along with the ejected water passing through the ejectors. The fumes are carried in a stream through fume inlet port 41. Here it may be noted that the spray 75 from nozzle 74 creates a water curtain through which the fume stream passes in its path of travel from the reactors. This water curtain also sets up a back pressure against the stream of fumes ejected by the ejectors which can be adjusted within limits by valve 73. The spray 75 also negates the draft created by the ejectors 21 and 21' so that the ejectors can be operated at high pressure to obtain high efficiency. That is, instead of lowering the pressure to the ejectors to control the draft in pipes 20, 20', the ejectors are operated at nearly maximum efficiency and the draft in these pipes is controlled by cutting down the efficiency of the ejectors by the back pressure supplied by spray 75. Controlling the draft in this manner is important in the chemical process since draft is a factor affecting the end product being made in the reactors. The stream of fumes passing through port 41 then passes into plenum 47, it being noted that the baffle 48 together with the water curtain provided by spray 81 together with the surface of the water, baffle 43, side wall 32 and top wall 35 provide the confined space or plenum. The pressure in the plenum 47 may be controlled within limits by valves 77 and 73, bearing in mind also that the water from the ejectors and nozzles will condense condensable fumes and will absorb the water soluble fumes from the stream of fumes as it passes through pipe 24 and plenum 47.

The residual stream which contains burnable fumes passes through passageway 49, through water curtain 81 into fume-air mixing chamber 42 wherein a negative pressure is maintained by the draft inducing steam ejector 102 in stack 105. The draft is adjusted to draw the fumes together with an adjusted amount of air through the mixing chamber 42, through fume outlet port 91, through main conduit pipes 90, 93 and 94, thence through the combustion chamber where the burnable part of the fumes are totally burned. The draft in stack 105 will draw air through the aperture 36, the effective area of which may be adjusted by the hinged cover door 37; thus the chamber 42 provides an air-fume mixing chamber wherein the air is carburetted by the burnable fumes in the fume stream passing therethrough, the arrangement constituting in effect a carburetor, to insure that the fumes which pass through the combustion chamber will be intermixed with sufficient oxygen to completely burn all combustible matter passing through the combustion zone 106. The combustion gases, having the obnoxious burnable fumes completely burned and destroyed by incineration, then pass out the stack 105 and are dissipated into the atmosphere without danger of creating a nuisance.

During the operation of the fume disposal system there is, as mentioned above, a certain amount of fumes condensed by the water from the ejectors 21, 21' and spray nozzles 74 and 80. Those condensed fumes which are not water soluble will collect as an oily-like condensate on the surface of the water in compartment 60 of the scrubber tank. This floating water-insoluble condensate cannot flow into compartment 61 because the upper edge of baffle 51 is higher than the level of the liquid in compartment 60. Water flows from compartment 60 through the submerged passage 54 which the oily-like condensate cannot reach for it floats on the water and is trapped out in compartment 60. At the end of a run or at the end of the day or after the reaction cycle has been completed, sufficient water is introduced into the compartment 60 to float the accumulated fume condensate over the top of baffle 51 and it will flow into compartment 62 over baffle 52 from which it may be withdrawn to waste either through overflow pipe 58 or drained through drain pipe 66.

While the plant described herein for illustrative purposes shows two reactors connected to a common incinerator unit, it will be understood that the invention lends itself to the inclusion of more than two reactor units connected to a single incinerator unit, it being apparent from the foregoing disclosure that each reactor, having its own ejector means, may be regulated and controlled independently. Moreover, the water ejected from each reactor provides a protective water curtain which inhibits flash back from the incinerator to its respective reactor.

The terms and expressions which have been employed herein are used as terms of description and not of limitation, and there is no intention in the use of such terms and expressions of excluding any equivalent of the features shown and described or portions thereof, but it is recognized that various modifications are possible within the scope of invention claimed.

What is claimed is:

1. In a plant having a reactor in which oils, resins, and the like are reacted and in which the reaction generates fumes which are disposed of by incineration, a fume conduit leading from said reactor, a scrubber tank into which said conduit leads, a water powered ejector withdrawing fumes from said reactor mounted in said conduit between said reactor and said tank, said tank having a passageway through which said fumes travel, water spray means in said tank providing a water curtain across the path of travel of said fumes and partially negating the draft induced by said ejector, means for introducing air into said tank, an incinerator connected to said tank, a fume stack leading from said incinerator, and draft inducing means within said stack, said ejector and stack draft inducing means being independently adjustable for controlling the relative suction in said reactor and said stack.

2. A system for disposal of fumes from a reactor vessel in which said fumes are generated which comprises a water scrubber tank having means defining a fume passageway, a conduit connecting said vessel and passageway, draft inducing means for withdrawing fumes from said vessel and passing the fumes as a confined stream through said conduit and passageway, a water spray device associated with the means defining said fume passageway and providing a water curtain in the path of travel of said stream of fumes passing through said passageway, means providing an aperture for the passage of air from the atmosphere into said passageway to form an air-fume mixture, an incinerator chamber in which said air-fume mixture is burned, a conduit connecting said passageway and incinerator chamber through which said air-fume mixture is carried to said chamber and a stack to carry the combustion gases from said chamber, and means adjustable to control the draft in said stack independently of the draft in said reactor vessel.

3. A system for disposal by incineration of fumes from a reactor vessel in which said fumes are generated which comprises a water scrubber tank having means associated therewith defining a fume passageway, a conduit connecting said vessel and passageway, a water powered ejector for inducing draft and withdrawing fumes from said vessel and passing the fumes as a confined stream through said conduit and passageway, a water spray device associated with said tank providing a water curtain in the path of travel of said stream of fumes passing through said passageway and partially negating the draft of said ejector, means providing an aperture for the passage of air from the atmosphere into said passageway to form an air-fume mixture, an adjustable member for increasing and decreasing the area of said aperture, an incinerator chamber in which said air-fume mixture is burned, a conduit connecting said passageway and incinerator chamber through which said air-fume mixture is carried to said chamber, a stack to carry the combustion gases from said chamber, and draft inducing means for independently controlling the draft in said stack.

4. A system for disposal of fumes from a plurality of reactor vessels in which said fumes are generated which comprises a water scrubber tank having means associated therewith defining a fume passageway, a main fume conduit connected to said passageway, a reactor fume conduit connecting each of said vessels to said main conduit, a water-powered ejector in each of said reactor fume conduits for independently controlling the draft in each reactor vessel and for withdrawing fumes from said vessels and passing the fumes as a stream through said main conduit and passageway, a water spray device associated with said tank providing a water curtain in the path of travel of said stream of fumes through said passageway and adjustable to reduce the effective draft of said ejectors, means providing an aperture for the passage of air from the atmosphere into said passageway to form an air-fume mixture, a movable member adjustable to vary the area of said aperture, an incinerator chamber in which said air-fume mixture is burned, a fume-air conduit connecting said passageway and incinerator chamber through which said air-fume mixture is carried to said chamber, a stack to carry the combustion gases from said chamber, and draft inducing means to independently vary the draft in said stack.

5. A system for disposal of fumes from a plurality of reactor vessels in which said fumes are generated which comprises a water scrubber tank having a fume passageway, a main fume conduit connected to said passageway, a reactor fume conduit connecting each of said vessels to said main conduit, a water-powered ejector in each of said reactor fume conduits for independently controlling the draft in each of said vessels and for withdrawing fumes from said vessels and passing the fumes as a stream through said conduit and passageway, a water spray device at the entrance of said passageway providing a water curtain in the path of travel of said stream of fumes through said passageway and adjustable to control the effective draft of said ejectors, a second water spray device providing a second water curtain in said passageway through which said stream passes, means providing an aperture for the passage of air from the atmosphere into said passageway after it has passed said second water curtain to form an air-fume mixture, an incinerator chamber in which said air-fume mixture is burned, a conduit connecting said passageway and incinerator chamber through which said air-fume mixture is carried to said chamber, a stack to carry the combustion gases from said chamber and an adjustable draft inducing means in said stack for independently controlling the draft in the stack.

6. A system for disposal of fumes from a plurality of reactor vessels in which said fumes are generated which comprises a water scrubber tank containing a body of water and having a fume passageway, a conduit connecting said vessel and passageway, draft inducing means including water power ejectors for withdrawing fumes from said vessels and passing the fumes as a stream through said conduit and passageway, a water spray device at the entrance of said passageway providing a water curtain in the path of travel of said stream of fumes through said passageway, a second water spray device in said passageway and providing a second water curtain through which said stream passes and spaced a distance from said first curtain, means providing an aperture for the passage of air from the atmosphere into said passageway after said stream has passed said second curtain to form an air-fume mixture, an openable and closable door for varying the effective area of said aperture, an incinerator chamber in which said air-fume mixture is burned, a conduit connecting said passageway and incinerator chamber through which said air-fume mixture is carried to said chamber, a stack to carry the combustion gases from said chamber, and a draft inducing device in said stack for independently inducing a draft therein, and means including a pump and connecting lines for circulating said water through said ejectors and water spray devices.

7. Apparatus for disposal of fumes from a plant for making varnish and the like having a plurality of reactors in which unwanted fumes are generated, which comprises a main conduit, a reactor fume conduit leading from each reactor to said main fume conduit, an ejector connected to each of said reactor conduits, each ejector withdrawing fumes from its respective reactor and discharging said fumes in a stream into said main conduit, a scrubber chamber having a fume inlet port and a fume outlet port and providing a fume passageway connecting with said ports through which said fumes travel, water spray devices mounted to discharge water as a curtain in said pasageway through which said fumes pass and partially negating the effective pressure of said ejectors, an incinerator furnace having a combustion chamber in which burnable fumes in said stream discharged from said passageway are burned, a fume conduit connecting said fume outlet port and said combustion chamber, a stack connected to said combustion chamber, means defining an air inlet port located between said water curtain and said outlet port of said scrubber chamber admitting air into the stream of fumes after the fumes have passed through said curtain to supply oxygen for burning said burnable fumes in said combustion chamber, and draft inducing means in the path of travel of said fumes causing the combustion gases from said incinerator to pass out of said stack to be dissipated.

8. Fume disposal apparatus in a plant for making varnish and the like having one or more reactor units each of which has a fume discharge conduit, which apparatus comprises an incinerator unit for burning burnable fumes generated in said reactors, and main conduit means for conducting fumes from each of said reactor fume discharge conduits to said incinerator unit, a scrubber unit comprising a tank located between said reactor units and said incinerator unit holding water in its lower portion, means including walls of said tank and said water defining a fume passageway through said tank through which said fumes travel, said passageway having a fume inlet port and a fume outlet port interposed in said main conduit, a water powered ejector connected to each of said reactor discharge conduits, water spray nozzles mounted to direct water spray in said passageway to form a water curtain in the path of travel of fumes withdrawn from said reactor and said water spray acting to reduce the effective draft of said ejectors, and a water pumping mechanism connected to circulate water through said nozzles, ejectors and tank.

9. Fume disposal apparatus in a plant for making varnish and the like having one or more reactor units each of which has a fume discharge conduit, which apparatus comprises an incinerator unit for burning burnable fumes generated in said reactors, and main conduit means for conducting fumes from each of said reactor fume discharge conduits to said incinerator unit, a scrubber unit comprising a tank located between said reactor units and said incinerator unit holding water in its lower portion, means including walls of said tank and said water defining a fume passageway through said tank through which said fumes travel, said passageway having a fume inlet port and a fume outlet port interposed in said main conduit, a water-powered ejector connected to each of said reactor discharge conduits, a water spray device mounted to direct water spray in said passageway to form a water curtain at said inlet port in the path of travel of fumes withdrawn from said reactor, a second water spray device mounted to direct a water spray to form a second water curtain a distance from said first curtain in the path of travel of said fumes in said passageway, an aperture for passage of air into said passageway after said fumes have passed through said second curtain, and means including a water pump and connecting lines for withdrawing water from said tank and pumping it through said ejectors and water spray devices and returning it to said tank.

JOHN P. ENGEL.

References Cited in the file of this patent

UNITED STATES PATENTS

| Number | Name | Date |
|---|---|---|
| 457,917 | Shaw | Aug. 18, 1891 |
| 468,378 | Wills | Feb. 9, 1892 |
| 880,747 | Morby | Mar. 3, 1908 |
| 1,779,282 | Louis | Oct. 21, 1930 |
| 2,031,554 | Torchet | Feb. 18, 1936 |
| 2,166,539 | Briscoe | July 18, 1939 |
| 2,243,176 | Henst | May 27, 1941 |
| 2,259,626 | Erikson | Oct. 21, 1941 |
| 2,284,317 | Greenberg | May 26, 1942 |
| 2,492,947 | Bellstedt | Jan. 3, 1950 |
| 2,506,972 | Schellentrager et al. | May 9, 1950 |
| 2,521,541 | Schneible et al. | Sept. 5, 1950 |
| 2,522,475 | Walker | Sept. 12, 1950 |
| 2,612,745 | Vecchio | Oct. 7, 1952 |